Sept. 30, 1930.    E. PENSOTTI    1,777,178
METHOD AND DEVICE FOR DIVIDING BREAD DOUGH INTO CAKES
Filed April 2, 1929    2 Sheets-Sheet 1
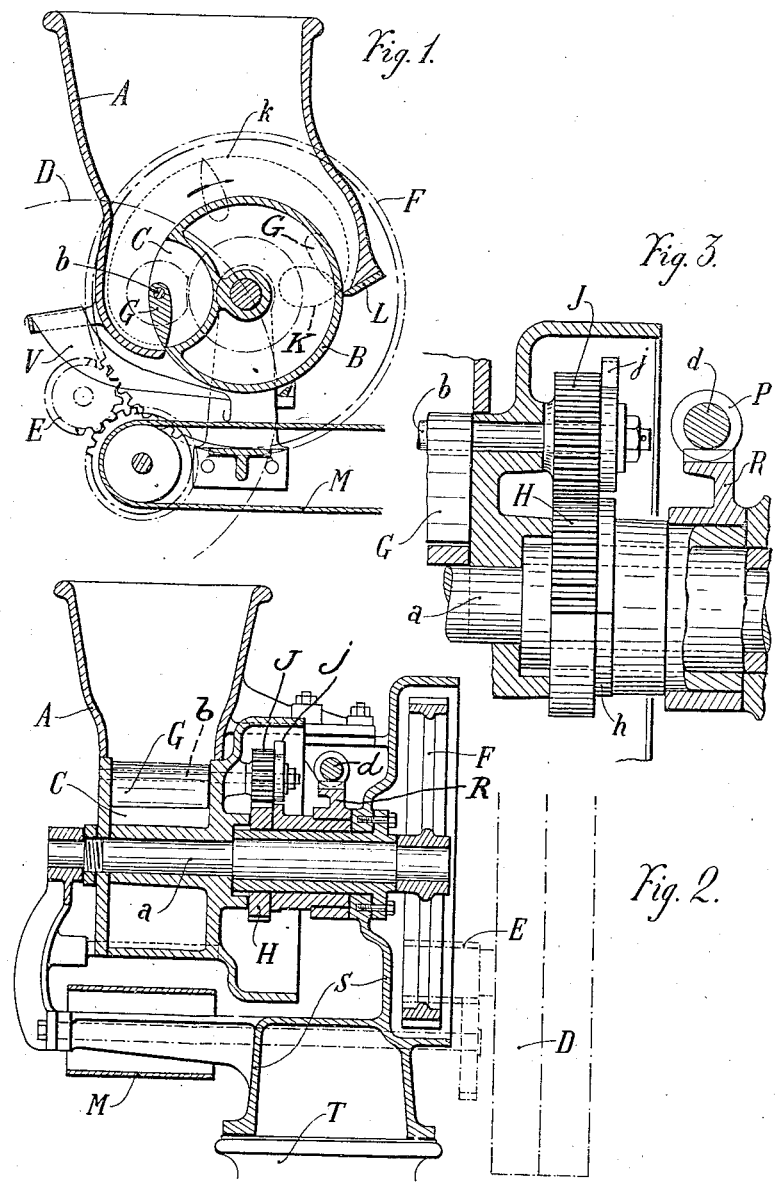

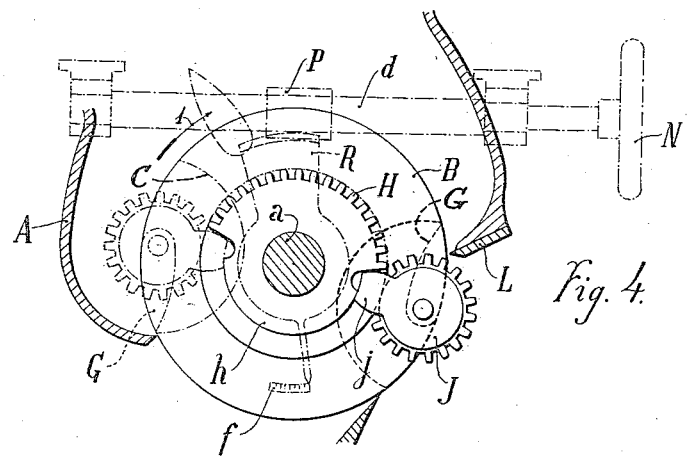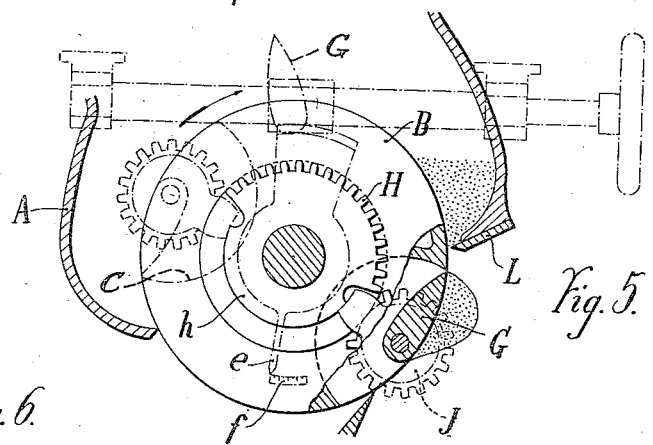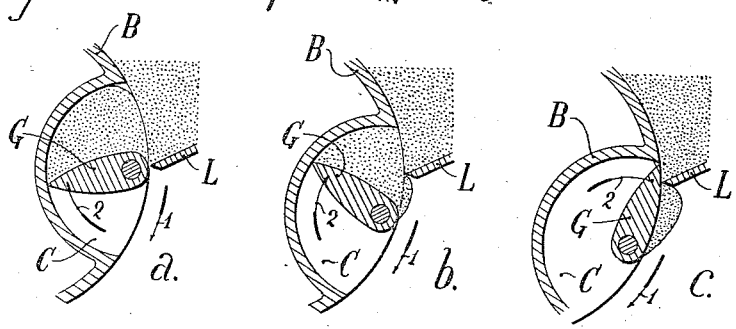

Patented Sept. 30, 1930

1,777,178

UNITED STATES PATENT OFFICE

EZIO PENSOTTI, OF MILAN, ITALY

METHOD AND DEVICE FOR DIVIDING BREAD DOUGH INTO CAKES

Application filed April 2, 1929, Serial No. 351,936, and in Italy September 4, 1928.

The present invention relates to a new method and a new machine for dividing bread dough into equal cakes and its object is to remove the disadvantages presented by other methods and machines employed for this operation, which disadvantages are caused above all by the use of moulds and knives which do not adapt themselves very well to the gummy nature of this dough, for the latter can never in fact rapidly and completely fill moulds with fixed walls as it should do with these methods and machines or be cut cleanly and accurately by knives which penetrate normally into its mass.

By taking these well accepted facts as a basis, the present invention eliminates the use of any kind of volumetric mould and guillotine cutting knives of the type mentioned; and in their place it employs a kind of rotating spatula for dividing the dough, which detach the portions of dough from the mass after the manner of spoons completely avoiding the necessity of making the dough slide under pressure along large fixed surfaces which would give rise, as ordinarily occurs, to considerable friction and abrasion and deformation of the cakes of dough themselves; and for the volumetric measurement of the cakes of dough it compels the subdivided dough to undergo a sort of rolling action to a clearly defined profile through an aperture which also presents no friction surface to the dough.

Moreover the invention fulfills the existing requirements in completely automatic modern bread making of providing only one single loaf at a time whatever be its dimensions and further permits the size of the loaves to be regulated very easily and as gradually as desired even during the working of the machine without it being necessary to exchange any of the dividing members but simply by varying the spacing between these members.

One form of construction of the machine which carries out the method forming the basis of the invention is illustrated in the accompanying drawings, in which:

Fig. 1 is a side view of a general arrangement of a machine in vertical longitudinal section.

Fig. 2 is a front view in vertical section.

Figs. 3, 4, 5 and $6^a$, $6^b$, $6^c$ are detail views and views showing various working positions in section to a larger scale.

The method and the device will be described simultaneously; in this way they will be more clearly and completely understood. The method and the device in question essentially employ an ordinary hopper A and as a base for the latter, a cylindrical roller B which is provided on its periphery with semi-cylindrical recesses C and is given a continuous and uniform movement of rotation by the driving pulley D acting by means of the pinion E and the toothed wheel F upon the shaft $a$ upon which the said roller is keyed. The semi-cylindrical recesses C of which there is only one in the example shown in the drawing, but which may be in any number in practice extend over the whole axial length of the roller except for the two bases of the latter, and along their axis $b$ they are each provided with a plate G, a kind of spatula or very robust flat spoon having the form of a banderole which during the rotation of the roller B turns about this axis $b$ with a planetary cycloidal movement along a path $k$ clearly shown in Fig. 1 in dotted lines.

The rotation of these plates or small spatulas is not continuous. It only takes place intermittently, that is to say only at the moment when the spatulas are in the interior of the hopper. When they are outside the hopper they remain motionless with respect to the roller and arranged in such a way that they continue the cylindrical surface of the roller as indicated in the drawings. For this purpose the rotation of these plates is controlled by a broken toothed wheel or circular rack H (Fig. 4) which is fixed in space and over its portion unprovided with teeth has the shape of a circular cam $h$ so as to present a fixed radial resting guide for the lug $j$ having the shape of a block, provided on the toothed wheel J which is rigid with the axis of rotation $b$ of the corresponding plate. The toothed part of the broken toothed wheel H extends only over about a half of its circumference so as to correspond with the rotation which each spatula must effect within the hopper, which rotation must be about one complete turn for about half a turn of the roller.

In this way from the moment when it enters into action (Fig. 1) each plate G, by following the path $k$ and acting after the manner of a spoon, detaches a portion of dough gradually from the mass and pushes this portion into the interior of its recess C but without appreciable friction upon the walls and without appreciable compression because this recess is not made to serve as a mold but to serve as an intermittent station for the purpose hereinafter explained, and it is therefore much larger in size than the volume of the piece of dough which has been detached and will finally be expelled.

The expulsion of the piece of dough from the recess in which it is provisionally situated only commences at the moment when the roller occupies the position shown in Fig. $6^a$. As the roller advances gradually during its rotation in the direction of the arrow (Fig. 1), a longitudinal slot is formed between the edge of the knife L touching the surface of the roller, and the recess C which is situated at this point, this slot being equal in length to the recess itself and having a width which gradually increases on account of the movement of the members. The dough is compelled to pass through this slot as through a roller by the pressure exerted by the plate itself, which during this time turns in the direction of the arrow (Fig. 2). As the rotation of the plate is cycloidal and more rapid than that of the roller, after a certain position (Fig. $6^b$) has been passed, the section of the said slot again decreases until it becomes zero in the position shown in Fig. $6^c$. At this moment the piece of dough is completely detached and is free. It falls upon an endless conveying band M and is carried away by the latter and led to the shaping machine.

The volume of the pieces of dough is regulated by varying their profile (shown approximately in the drawings) by advancing or retarding the initial (Fig. 1) and final (Figures 4 or 5 or $6^a$) positions of the plates. For this purpose the broken toothed wheel H may be displaced through a varying angle in space by means of the regulating shaft $d$ provided with the hand wheel N which acts upon this toothed wheel H through the medium of the worm P and the toothed sector R, the latter being rigid with the toothed wheel H itself. In this way in fact although the expulsion slots will always commence to open at the same moment, that is to say always for the same position of the roller B (Fig. $6^a$) since this opening does not depend upon the above mentioned angular adjustment but only on the position of the roller, the final closure of the slot will on the other hand occur earlier or later on this account (Fig. $6^c$) and will depend upon the angle already described by the plate at the moment this opening commences (Fig. $6^a$); and consequently the amount of dough expelled will vary as desired between two obvious maximum and minimum limits determined by the limited angular adjustment in two directions of the toothed wheel H or sector R depending upon the dimensions of the machine and those of the plates G. The sector R is provided with a pointer $e$ which indicates upon a dial $f$ the position occupied. This adjustment can also be effected during the working of the machine and this feature is of great advantage because, as the dough is a fermenting material, it undergoes a change and its specific volume and weight vary all the time so that a continual adjustment of the volume measuring member becomes necessary if it is desired to obtain a practically perfect uniformity in the weight of the successive pieces of dough cut off.

Moreover if the regulating shaft $d$ is connected with an automatic weighing device, for example a continuous weighing balance, through which passes the same band M, the adjustment may also be applied in a completely accurate and automatic manner.

The machine is assembled and carried upon a frame S surmounting a column T. All the parts are protected but are easily accessible and interchangeable for inspection or renewal.

From the foregoing it will be clearly seen that in addition to the fact that the pieces of dough are withdrawn from all friction and risk of abrasion, the unfortuiate effect of which is well known to bakers, these pieces of dough are also given an intermediate position or position of rest, in the recesses C in which these pieces of dough are allowed to adjust all their internal stresses and become again perfectly homogeneous so that the volume which is cut off will be in fact proportional to the weight.

There is no danger of the expelling slot producing appreciable abrasions or changes of stresses in the dough because the knife L which is the only member to be considered, only acts upon its edge and not as a knife but neither more nor less than a stretched wire and can therefore only produce an imperceptible adherence which is practically nil.

The funnel V made of sheet metal serves for dusting the band M, the roller B and the plates G with dry flour.

What I claim is:

1. A device for dividing bread dough into cakes comprising a dough containing hopper (A) having a base and an aperture in said base, a cylindrical roller (B) rotatably mounted in said base and closing said aperture, means for rotating said roller continuously at a uniform speed, the roller having formed in it a substantially semi-cylindrical recess (C) having its axis lying along a generating line of the roller, an edge forming surface (L) lying along the base of said hopper and touching the circumference of the roller, forming with said recess a slot of constant length and gradually increasing and then decreasing width during the passage of the recess over said edge, a dough dividing plate (G) supported in said recess and rotatable about the axis of said recess, means for producing an intermittent rotation of said plate (G) and such that when said recess (C) is within the hopper said plate first detaches a piece of dough, moves said dough into said recess, and then expels it through said gradually opening and closing slot, and when said recess is outside the hopper said plate remains stationary with its outer surface continuing the surface of said roller.

2. A device for dividing bread dough into cakes comprising a dough containing hopper (A) having a base and an aperture in said base, a cylindrical roller (B) rotatably mouted in said base and closing said aperture, means for rotating said roller continuously at a uniform speed, the roller having formed in it a subtantially semi-cylindrical recess (C) having its axis lying along a generating line of the roller, an edge forming surface (L) lying along the base of said hopper and touching the circumference of the roller, forming with said recess a slot of constant length and gradually increasing and then decreasing width during the passage of the recess over said edge, a dough dividing plate (G) supported in said recess and rotatable about the axis of said recess, means for producing an intermittent rotation of said plate (G) and such that when said recess (C) is within the hopper said plate first detaches a piece of dough, moves said dough into said recess, and then expels it through said gradually opening and closing slot, and when said recess is outside the hopper said plate remains stationary with its outer surface continuing the surface of said roller, the means for producing the intermittent rotation of said plate comprising a pinion (J) rigid with said plate and rotatable with said plate about the axis of said plate, a block (j) rigid with said plate, a fixed circular rack (H) having teeth over a portion of its circumference engaging said pinion during a part of the rotation of said roller and thereby rotating said plate, and having the form of a smooth circular cam (h) over the remainder of its circumference engaging said block and thereby arresting the rotation of said plate over the remainder of the rotation of said roller.

3. A device for dividing bread dough into cakes comprising a dough containing hopper (A) having a base and an aperture in said base, a cylindrical roller (B) rotatably mounted in said base and closing said aperture, means for rotating said roller continuously at a uniform speed, the roller having formed in it a substantially semi-cylindrical recess (C) having its axis lying along a generating line of the roller, an edge forming surface (L) lying along the base of said hopper and touching the circumference of the roller, forming with said recess a slot of constant length and gradually increasing and then decreasing width during the passage of the recess over said edge, a dough dividing plate (G) supported in said recess and rotatable about the axis of said recess, means for producing an intermittent rotation of said plate (G) and such that when said recess (C) is within the hopper said plate first detaches a piece of dough, moves said dough into said recess, and then expels it through said gradually opening and closing slot, and when said recess is outside the hopper said plate remains stationary with its outer surface continuing the surface of said roller, the means for producing the intermittent rotation of said plate comprising, a pinion (J) rigid with said plate and rotatable with said plate about the axis of said plate, a block (j) rigid with said plate, an angularly adjustable fixed circular rack (H) having teeth over a portion of its circumference engaging said pinion during a part of the rotation of said roller and thereby rotating said plate, and having the form of a smooth circular cam (h) over the remainder of its circumference engaging said block and thereby arresting the rotation of said plate over the remainder of the rotation of said roller, means for adjusting continuously said rack angularly even during the operation of the machine and thereby regulating the moment of closing of said slot, the moment of opening remaining fixed.

4. A device for dividing bread dough into cakes, as claimed in claim 3, the means for adjusting said rack angularly comprising a toothed sector (R) rigid with said rack (H), a worm (P) engaging said sector and means for actuating said worm.

In testimony whereof I have signed my name to this specification.

EZIO PENSOTTI.